United States Patent
Daniels et al.

(10) Patent No.: US 11,117,325 B2
(45) Date of Patent: Sep. 14, 2021

(54) COMPOSITE-BASED ADDITIVE MANUFACTURING (CBAM) AUGMENTED REALITY ASSISTED SAND BLASTING

(71) Applicant: Xerox Corporation, Norwalk, CT (US)

(72) Inventors: Marc D. Daniels, Webster, NY (US); Wayne A. Buchar, Bloomfield, NY (US)

(73) Assignee: Xerox Corporation, Norwalk, CT (US)

(*) Notice: Subject to any disclaimer, the term of this patent is extended or adjusted under 35 U.S.C. 154(b) by 23 days.

(21) Appl. No.: 16/370,396

(22) Filed: Mar. 29, 2019

(65) Prior Publication Data

US 2020/0307097 A1     Oct. 1, 2020

(51) Int. Cl.
| | |
|---|---|
| *B32B 41/00* | (2006.01) |
| *B29C 64/386* | (2017.01) |
| *B29C 64/147* | (2017.01) |
| *G03G 15/22* | (2006.01) |
| *B29C 64/245* | (2017.01) |
| *B29C 64/209* | (2017.01) |

(52) U.S. Cl.
CPC .......... *B29C 64/386* (2017.08); *B29C 64/147* (2017.08); *B29C 64/209* (2017.08); *B29C 64/245* (2017.08); *G03G 15/224* (2013.01)

(58) Field of Classification Search
CPC ... B29C 64/386; B29C 64/209; B29C 64/245; B29C 64/147; G03G 15/224
USPC .................... 156/60, 64, 350, 351, 378, 379
See application file for complete search history.

(56) References Cited

U.S. PATENT DOCUMENTS

| | | | |
|---|---|---|---|
| 3,473,205 A | 10/1969 | Zocher | |
| 3,774,273 A | 11/1973 | Okamoto et al. | |
| 5,173,733 A | 12/1992 | Green | |
| 5,301,863 A * | 4/1994 | Prinz ...................... | B22F 3/008 |
| | | | 228/33 |
| 5,943,125 A | 8/1999 | King et al. | |
| 6,377,758 B1 | 4/2002 | OuYang et al. | |
| 7,050,078 B2 | 5/2006 | Dempski | |

(Continued)

FOREIGN PATENT DOCUMENTS

| | | |
|---|---|---|
| EP | 2776233 | 12/2017 |
| WO | WO2014134224 | 9/2014 |

OTHER PUBLICATIONS

Wikipedia (2018). Augmented Reality. Wikipedia, the free encyclopedia. Dec. 6, 2018 from https://en.wikipedia.org/wiki/Augmented_reality.

(Continued)

*Primary Examiner* — Michael N Orlando
*Assistant Examiner* — Joshel Rivera
(74) *Attorney, Agent, or Firm* — Caesar Rivise, PC (57) ABSTRACT

Apparatus and methods are disclosed to provide a guide for sand blasting a fiber-reinforced object. The proposed guide consist of three-dimensional (3D) features that will result in reflective ray-like protrusions that can be detected and displayed by Augmented Reality (AR) hardware including a head mounted display. The AR hardware determines a virtual object to be presented in a field of view, a position in the field of view, and a perspective of the virtual object in the field of view based on position information from the reflective ray-like protrusions. At least a portion of the sand blasting area is observable through the display and lens when the display is presenting the rendered virtual object.

14 Claims, 5 Drawing Sheets

(56) References Cited

U.S. PATENT DOCUMENTS

| | | | |
|---|---|---|---|
| 7,324,081 B2 | 1/2008 | Friedrich et al. | |
| 7,463,149 B2 | 12/2008 | Friedrich et al. | |
| 8,116,585 B2 | 2/2012 | Wu et al. | |
| 8,496,370 B2 | 7/2013 | Hsu | |
| 8,756,894 B2 | 6/2014 | Swartz et al. | |
| 8,786,686 B1 | 7/2014 | Amirparviz | |
| 8,847,953 B1 * | 9/2014 | Cho | G06T 19/20 345/420 |
| 9,266,287 B2 | 2/2016 | Kautz et al. | |
| 9,393,770 B2 | 7/2016 | Swartz et al. | |
| 9,507,788 B2 | 11/2016 | Pavlov et al. | |
| 9,550,349 B1 * | 1/2017 | Larsen | F28D 20/02 |
| 9,683,950 B2 | 6/2017 | Sarrazin et al. | |
| 9,740,974 B2 | 8/2017 | Kumar et al. | |
| 9,776,376 B2 | 10/2017 | Swartz et al. | |
| 9,827,754 B2 | 11/2017 | Swartz et al. | |
| 9,833,949 B2 | 12/2017 | Swartz et al. | |
| 10,046,552 B2 | 8/2018 | Swartz et al. | |
| 2002/0133264 A1 | 9/2002 | Maiteh et al. | |
| 2006/0255525 A1 | 11/2006 | Dinatale et al. | |
| 2013/0171431 A1 | 7/2013 | Swartz et al. | |
| 2014/0085620 A1 | 3/2014 | Lobovsky et al. | |
| 2014/0238173 A1 | 8/2014 | Swartz et al. | |
| 2014/0257549 A1 | 9/2014 | Swartz et al. | |
| 2015/0034123 A1 | 2/2015 | Pressacco et al. | |
| 2015/0158246 A1 | 6/2015 | Swartz et al. | |
| 2015/0231825 A1 | 8/2015 | Swartz et al. | |
| 2016/0082657 A1 | 3/2016 | Swartz et al. | |
| 2016/0082658 A1 | 3/2016 | Swartz et al. | |
| 2016/0260261 A1 | 9/2016 | Hsu | |
| 2016/0297142 A1 | 10/2016 | Bheda et al. | |
| 2016/0339645 A1 | 11/2016 | Swartz et al. | |
| 2017/0106586 A1 | 4/2017 | Keoshkerian et al. | |
| 2017/0144426 A1 | 5/2017 | Moore et al. | |
| 2017/0151719 A1 | 6/2017 | Swartz et al. | |
| 2017/0291223 A1 | 10/2017 | Swartz et al. | |
| 2017/0297263 A1 * | 10/2017 | Ederer | B28B 7/348 |
| 2017/0297303 A1 | 10/2017 | Swartz | |
| 2017/0368744 A1 | 12/2017 | Zona et al. | |
| 2018/0008141 A1 | 1/2018 | Krueger | |
| 2018/0017679 A1 * | 1/2018 | Valouch | A63F 13/655 |
| 2018/0022065 A1 | 1/2018 | Swartz et al. | |
| 2018/0072001 A1 | 3/2018 | Swartz et al. | |
| 2018/0141305 A9 | 5/2018 | Swartz et al. | |
| 2018/0264725 A1 | 9/2018 | Swartz et al. | |
| 2018/0264732 A1 | 9/2018 | Swartz et al. | |
| 2019/0067077 A1 | 2/2019 | Muramoto | |

OTHER PUBLICATIONS

Impossible Objects' CBAM Pilot Project (video), https://www.youtube.com/watch?v=Dn37IXU2K0M, retrieved Dec. 12, 2018.

* cited by examiner

COMPOSITE-BASED ADDITIVE MANUFACTURING (CBAM) AUGMENTED REALITY ASSISTED SAND BLASTING

BACKGROUND OF THE INVENTION

This disclosure relates generally to systems and methods for composite-based additive manufacturing, and more particularly, to the use of augmented reality for excess polymer removal during the additive manufacturing process.

BACKGROUND

Traditional object, part and component manufacturing processes, which generally included varying forms of molding or machining of output products, have expanded to include commercial implementations of a new class of techniques globally referred to as "additive manufacturing" or composite based additive manufacturing (CBAM). These AM techniques generally involve processes, alternatively referred to as "Solid Freeform Fabrication (SFF)" or "3D printing" in which layers of additive materials, sometimes toxic or otherwise hazardous in an unfinished state are sequentially deposited on an in-process 3D object according to a particular material deposition and curing scheme. As each layer is added in the 3D object forming process, the new layer of material is added and adhered to the one or more already existing layers. Each AM layer may then be individually cured, at least partially, prior to deposition of any next AM layer in the 3D object build process. This sequential-layer material addition/joining throughout a 3D work envelope is executed under automated control of varying levels of sophistication.

AM manufacturing techniques include, but are not limited to, those techniques that have come to be referred to broadly as "3D printing" techniques usable for producing 3D printed objects. 3D printing techniques employ one or more processes that are adapted from, and appear in some respects to be similar to, well-known processes for forming two-dimensional (2D) printed images on image receiving media substrates. Significant differences in the output structures produced by the 3D printing techniques are generally based on (1) a composition of the deposited materials that are used to form the output 3D printed objects from the 3D printer; and/or (2) a number of passes made by the "print" heads in depositing comparatively large numbers of successive (and very thin) layers of the deposition material to build up the layers to the form of the output 3D printed objects.

A number of powder-based AM techniques have been commercialized. These include Selective Laser Sintering (SLS), as well as certain adaptations of toner-based 2D printing technologies for 3D printing. Those of skill in the art recognize that, in certain of these implementations, no separate support structures are typically required to support the creation of certain complex shapes. In certain of these processes, powdered materials are selectively consolidated into 3D objects with excess powder being manually removed. In an SLS process, for example, a thin layer of powder is deposited in a workspace container and the powder is then fused together using a laser beam that traces the shape of the desired cross-section. The process is repeated by depositing layers of powder thus building the 3D object in this manner layer by layer. In a typical toner-based 3D printing process, a binder material selectively binds powder deposited in layers in a printing technology used to generally print the binder in a shape of a cross-section of the 3D object on each layer of powder.

An expanding number of AM or 3D printing processes and techniques are now available. Principal distinguishing characteristic between the multiplicities of these AM or 3D printing processes are in the manner in which the layers are deposited to create the output 3D objects, and in the materials that are used to form the output 3D objects.

Certain of the AM techniques (as this term will be used throughout the balance of this disclosure to refer to various 3D object layering and build techniques including 3D printing) melt or soften materials to produce the build layers using techniques such as, for example, selective laser melting or sintering of an input material through applied heat. Others of the AM manufacturing techniques deposit and cure liquid materials using technologies for the deposition of those liquid materials such as jetted (ink) material "printing" techniques.

Some 3D printers use a process of printing plastic in the image of the part cross section onto a fibrinous sheet, such as carbon fiber, and then stacking many sheets to form a stack that will become a 3D part after the stack is heated to melt or cure the plastic and the stack compressed. The unwanted, excess substrate is then removed by sand-blasting or chemical process, resulting in a fiber-reinforced object that is light weight, yet strong.

The current practice of sand blasting depends upon an operator's skill in knowing what the end product looks like, and judiciously removing excess substrate. The excess substrate is significantly easier to remove than the hardened polymer, but there are occasions, especially on the first attempt, where the operator sand blasts through too much hardened polymer, which results in a defective object that must be scrapped.

SUMMARY

Apparatus and methods are disclosed to provide a guide for sand blasting a fiber-reinforced object. The proposed guide consist of three-dimensional (3D) features that will result in reflective ray-like protrusions that can be detected and displayed by Augmented Reality (AR) hardware including a head mounted display. The AR hardware determines a virtual object to be presented in a field of view, a position in the field of view, and a perspective of the virtual object in the field of view based on position information from the reflective ray-like protrusions. At least a portion of the sand blasting area is observable through the display and lens when the display is presenting the rendered virtual object.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

In one aspect, an object manufacturing system, the system comprising a movable platform to receive a build surface; a first device configured to transfer a first wetting agent on the build surface; a second device configured to transfer a second wetting agent on the build surface; wherein the second wetting agent comprises a wetting agent with reflective properties; a material depositing system configured to deposit a layer of material onto the build surface; and a transfuse station configure to fuse the deposited layer of material; wherein each layer of an object is assembled in a stepwise fashion until the entire object is built; wherein material deposited on the second wetting agent causes an outside surface of the built object to reflect incident wavelength of electromagnetic (EM) radiation.

In another aspect, wherein the first device is a print head to selectively deposit the first wetting agent.

In another aspect, wherein the second device is a print head to selectively deposit the second wetting agent.

In a further aspect, an optical sensor to collect data from the reflected wavelength of electromagnetic radiation.

In a further aspect, an augmented reality controller to, based on the collected data from the image sensor, determine a virtual object to be presented in a field of view, a position of the virtual object in the field of view, and a perspective of the simulated object in the field of view.

In yet a further aspect, a display configured to render the virtual object in a field of view of a viewer.

In another aspect, wherein the display comprises augmented reality (AR) hardware.

In another aspect, wherein the display comprises a see-through head-mounted display.

In another aspect, wherein the second wetting agent and the material form at least one reflective protrusion.

In still another aspect, wherein the at least one reflective protrusion is embedded into the built object and wherein the virtual object includes what the built object should look like after sand blasting.

In yet another aspect of the disclosed embodiments relate to a method of printing an object onto a build platform using a printing system, the method comprising causing a movable platform to receive a build surface; causing a first image-forming device configured to transfer a first wetting agent on the build surface; causing a second image-forming device configured to transfer a second wetting agent on the build surface; wherein the second wetting agent comprises a wetting agent with reflective properties; causing a material depositing system configured to deposit a layer of material onto the build surface; and using a transfuse station configure to fuse the deposited layer of material; wherein each layer of an object is assembled in a stepwise fashion until the entire object is built; wherein material deposited on the second wetting agent causes an outside surface of the built object to reflect incident wavelength of electromagnetic radiation.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for printing onto a substrate web and automatically stacking individual sheets of the web for AM manufacturing.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The terms "media", "web", "web substrate", "print substrate" and "substrate sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, non-woven fabrics, metal films, carbon fiber reinforced material and foils, as readily understood by a skilled artisan.

The term "marking material" as used herein may refer to printing matter deposited by an image forming device onto a web substrate to form an image on the substrate. The listed term "marking material" may include inks, toners, metal particles, plastics, pigments, powders, molten materials, polyamide, nylon, glass filled polyamide, epoxy resins, bio-based resins, wax, graphite, graphene, carbon fiber, photopolymers, polycarbonate, polyethylene, Polylactic acid (PLA), Polyvinyl alcohol (PVA), ABS filament, high-density polyethylene (HDPE), high impact polystyrene (HIPS), Polyethylene terephthalate (PETT), ceramics, conductive filament and other ink jet materials.

The term 'image forming device", "printing device" or "printer" as used herein encompasses any apparatus that performs a print outputting function for any purpose, such as a digital copier, scanner, image printing machine, xerographic device, digital production press, document processing system, image reproduction machine, bookmaking machine, facsimile machine, multi-function machine, or the like and can include several marking engines, feed mechanism, scanning assembly as well as other print media processing units, such as paper feeders, finishers, and the like. An image forming device can handle sheets, webs, marking materials, and the like. An image forming device can place marks on any surface, and the like and is any machine that reads marks on input sheets; or any combination of such machines. A 3D printer can make a 3D object, and the like. It will be understood that the structures depicted in the figures may include additional features not depicted for simplicity, while depicted structures may be removed or modified.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The examples further include at least one machine-readable medium comprising a plurality of instructions, when executed on a computing device, to implement or perform a method as disclosed herein. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

As used herein, unless otherwise specified, the term "object" can also mean part, element, piece, or component. As used herein, an object refers to a 3D object to be individually built, or actually built, by a 3D printing system (printer). An object, as referred herein, is built by successively adding layers so as to form an integral piece. Some printers are capable of building, as part of the same print job, a plurality of independent pieces from a 3D model including a plurality of independent 3D objects. An object may include void spaces embedded in the object body.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Figure 1:
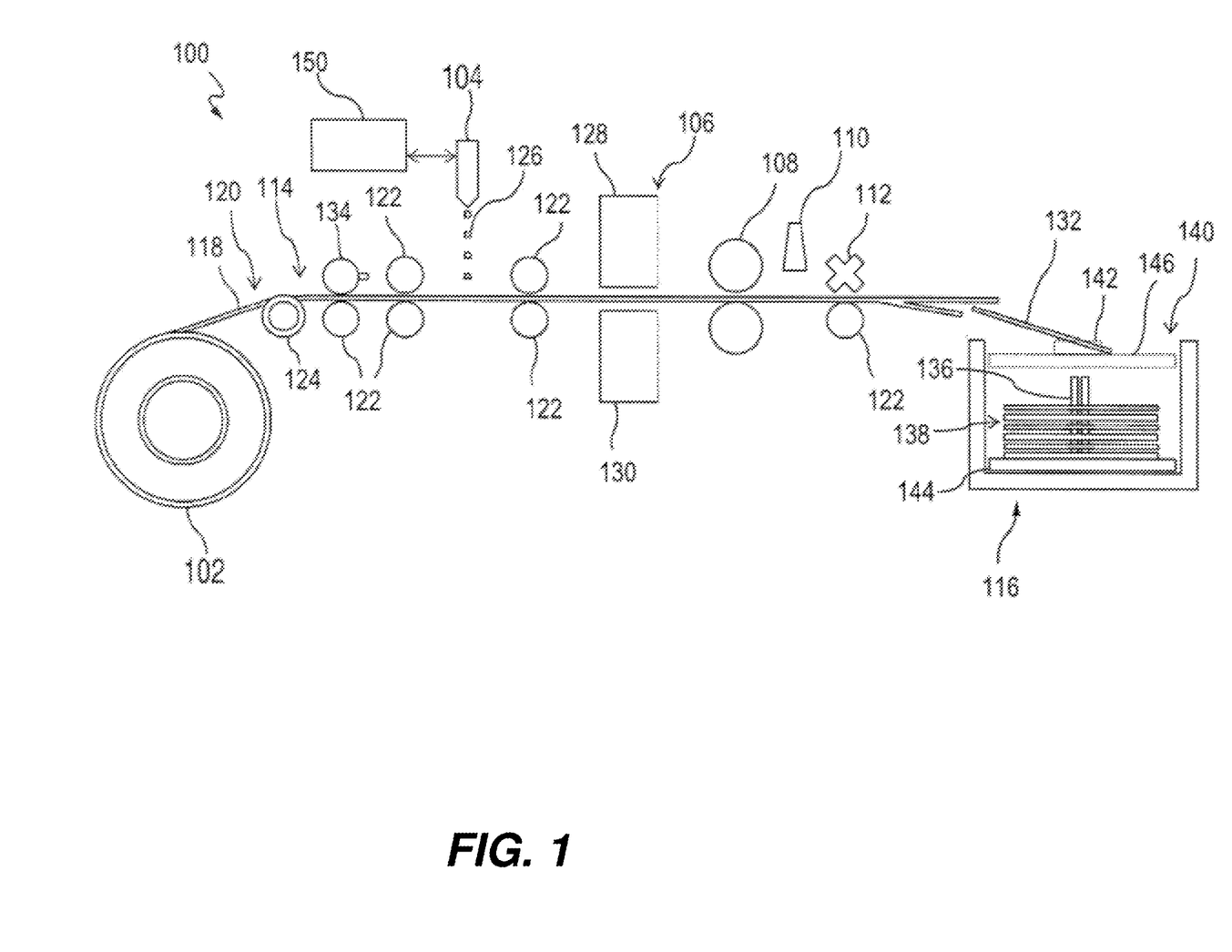
FIG. 1 is a side view of an additive manufacturing system for printing 3D objects in accordance with an example of the embodiments.

FIG. 1 is a block diagram of an exemplary AM system 100 for printing 3D objects. The AM system 100 may include components such as a material feeder 102, an image-forming device 104, a powder subsystem 106, a fuser 108, a sensor 110, a cutter 112, a transfer subsystem 114, a stacker subsystem 116, and other features that connect and control the various components. While exemplary components are shown in FIG. 1, various alternative and optional components are also suitable for use with the system 100.

In illustrative implementations, a three-dimensional (3D) object is printed in accordance with a computer 3D model of the object, created by a computer-aided design (CAD) program. For example, the CAD program may be a free-form non-uniform rational basis spline (NURBS) program, or the CAD program may be Solid Works®. In the AM system 100, marking material 148 (e.g., powder) is selectively deposited by powder subsystem 106 in a physical pattern on a substrate material 118 (or substrate sheets thereof) that corresponds to a "positive image' of a thin slice or layer of the 3D object as defined by image forming device 104. For each slice of the 3D object, powder is attached in a pattern that correspond to positions in the slice where the 3D object exists, and powder is not attached to the substrate in positions in the slice where the 3D object does not exist. Thin slices of the 3D CAD model may be created, for example, by starting with a 3D model in STL file format and using the Slice Commander feature of netfabb(R) Studio software (available from netfabb GmbH, Parsberg, Germany) to create the thin slices. This cycle of selectively patterning substrate sheets repeated for as many additional substrate sheets as required for making the specified 3D part or object, with each sheet normally representing a layer of the 3D part or object.

The material feeder 102 holds the substrate material 118 (e.g., carbon fiber, paper) in roll or sheet form (here shown in roll form for example) and places the substrate material in proper position for transfer to the image-forming device 104. Carbon fiber is typically dark grey, but other substrates may be of other colors such as a light color. The substrate material 118 may be transferred to the image-forming device 104 via the transfer subsystem 114, which may include a tensioning mechanism 120 together with feed rollers 122 used to hold and advance the web defined by the length of the substrate material fed through the AM system 100. The tensioning mechanism 120 may include one or more rollers 124 situated to keep the substrate material 118 taught as it is fed components of the AM system. The web of substrate material 118 can extend through all of the components of the AM system, including the image-forming device 104, the powder subsystem 106, the fuser 108, the sensor 110, and then be cut by the cutter 112 into single sheets prior to stacking, as discussed in greater detail below.

The image-forming device 104 may then deposit a pattern of fluid 126 in image-wise fashion at precise locations onto the substrate material 118. The fluid 126 is selectively deposited on the substrate material 118 so that some parts of the material are covered with liquid as a positive image of a slice of a 3d object, and some parts of the material are not. The fluid 126 is commonly referred to as a wetting agent generally comprising of Polyethylene Glycol (PEG) which a clear fluid. The pattern of fluid 126 may be deposited via a variety of approaches. For example, the image-forming device 104 may include a thermal inkjet head or a piezo-electric inkjet head to dispense the fluid. In examples, the image-forming device 104 may apply air pressure to dispense the fluid 126. The image-forming device 104 may also include a solenoid valve if air pressure is used to control the release of air or dispensing of fluid.

In some cases, the fluid that is selectively deposited may be water or an aqueous solution that includes a material that slows the evaporation of water. For example, the aqueous solution may include 2-pyrrolidinone. In other cases, a different fluid, such as an alcohol may be selectively deposited. For example, if the substrate material 118 is water sensitive (e.g. polyvinyl alcohol, PVOH), then water may distort or dissolve the substrate material. In that case, an alcohol may be used as the fluid that is selectively deposited. In some cases, to prevent a liquid fluid that is selectively deposited from spreading or being excessively absorbed into the substrate, it is helpful to apply a surface energy modifier or repellent to the substrate before selectively depositing the liquid fluid.

The material feeder 102 then transfers the substrate material 118 to the powder subsystem 106, which includes a powder applicator 128 and a powder remover 130 that may be provided as separate components or integrated into a single component. In either arrangement, the powder applicator 128 is configured to deposit a 3D object powder (e.g., thermoplastic powder) onto the substrate material. The powder is configured to adhere to the areas of the substrate that have been made wet by the image-forming device 104, i.e., the layer images. In other words, the powder applicator 128 deposits powder, such as, but not limited to, thermoplastic powder, onto the surface of the substrate material 118 on which patterned layer shapes have just been printed. The powder sticks to the printed (wet) areas on the sheet, but does not adhere to portions of the substrate that are not covered with the fluid.

In typical application, the powder applicator 128 may include a trough containing the powder. The trough may have a slitted opening on its underside and is connected to an electromechanical vibrator of the powder subsystem. The vibrator, when active, causes the powder to flow downward through the slitted opening and out of the trough onto the substrate while it moves under the trough. The vibrator is actuated by a controller 150 that may include a sensor circuit that senses the presence of the patterned fluid on the substrate underneath. When the patterned fluid has completely passed, the vibrator may deactivate to cease powder flow from the trough.

The powder may be selectively deposited by other approaches. For example, the powder may be selectively deposited by flooding one side of a layer of substrate with powder, then selectively heating the opposite side of the substrate with an appropriate device such as a thermal printhead or print head. In this approach, the thermal print head includes a high-resolution array of heating elements, which may be selectively turned on or off. In the areas that are heated, the powder melts and adheres to the substrate. The excess powder that has not adhered is removed, for example by vacuuming the excess powder by the powder remover 130 or turning the substrate over with the excess powder falling off the substrate via gravity.

Alternatively, powder may be deposited using a selective deposition technique similar to that employed in xerographic printing. In this approach, an electrical charge is imparted to powder particles, which are directed toward the substrate 118 and then selectively adhere to some portions of the substrate, but not others due to electrostatic attraction or repulsion. The powder particles adhere to portions of the substrate that have an opposite electrical charge, or that are adjacent to a substrate surface that has such a charge, and are repelled from portions of the substrate that have the same electrical charge or that are adjacent to a substrate surface that has such a charge.

The powder may be alternatively deposited using a selective deposition technique similar to that employed in magnetographic printing. In this approach, powder selectively adheres to some portions of the substrate layer, but not others due to magnetostatic interactions between the powder and the substrate surface, or a substrate layer adjacent to the substrate surface. For example, the powder may be a single component magnetic toner, a colloidal suspension (e.g., a ferrofluid), or a dual component toner. A variety of magnetic pigments, such as magnetite (FeO) or ferric oxide ((FeO), may be used for the toner in this approach.

In all of the above examples, the step of selectively depositing powder may include a substep of directing solid powder toward the substrate 118 in a non-selective manner. For example, this substep may include flooding the entire surface of the substrate with powder. Or for example, in the xerographic or magnetographic examples, this substep may include sending electrically charged or magnetized powder toward the entire substrate layer Still referring to FIG. 1, the powder remover 130 then removes any powder that does not adhere to the substrate. The powder may be removed from the substrate, for example, by vacuuming the excess powder off as it moves adjacent the powder remover. In typical application, the powder remover 130 may include a vacuum having a vacuum motor coupled to a cyclone (to be described later). In operation, the vacuum pulls the powder that does not adhere to the substrate, while powder applied to the printed areas remain. The cyclone may recirculate the vacuumed powder back to the powder applicator 128 for reuse, as well understood by a skilled artisan. In certain circumstances the amount of powder removal from the vacuum may be insufficient since some unwanted powder may still reside on the substrate material. For this reason the powder remover 130 may include an air knife after the vacuum to remove any remaining excess powder from the substrate. The removed excess powder may also be recirculated by the cyclone back to the powder applicator for reuse.

The powder system 106 can be set to run continuously so that, once the substrate material 118 passes the image forming device 104, the substrate automatically travels through the powder system 106. Alternatively, the controller 150 in communication with the transfer subsystem 114, the image forming device and the powder system 106 can instruct the powder applicator 128 and powder remover 130 or subsystems thereof to turn on and off at the appropriate times.

After the substrate 118 has had powder applied and excess powder removed, the remaining powder may be melted onto the substrate so that the powder more permanently affixes to the printed areas of the substrate and is thus protected from displacement, disruption, or falling off during subsequent processing steps. To this end, an optional fuser 108 may be disposed after the powder system 106. The fuser 108 may be disposed above, below, or adjacent to the substrate leading out of the powder remover 130. The fuser 108 may be, for example but not limited to, radiant, IR, or other heating approach sufficient to melt and thereby fix the patterned powder to the substrate. As the substrate 118 travels out of the powder system 106, the heat from the fuser 108 melts the powder on the substrate surface causing it to fix to the substrate.

The AM system 100 may optionally have a sensor 110 (e.g., an imaging device such as a camera) to ensure that the system has not malfunctioned, that the appropriate amount of powder is deposited, that the substrate is moving as desired, that individual substrate sheets are moving as desired, and other quality assurance aspects of the process. The sensor may operate based, for example, on input from the controller 150, or automatically upon detection of an edge of printed material or a substrate sheet.

As noted above in the exemplary AM system 100, the roll 102 of substrate material 118 is mounted and situated ahead of the image-forming device 104. While not being limited to a particular theory, the web of substrate material 118 can extend through all of the components of the AM system, including the image-forming device 104, the powder subsystem 106, the fuser 108, the sensor 110, and then be cut by the cutter 112 into single sheets 132 prior to stacking. In examples, the web of substrate material 118 may be cut by the cutter 112 into single sheets 132 at any prior point in the process. For example, the web may be converted to a single sheet prior to advancing the resulting substrate sheet to the image-forming device 104. Likewise, the web may be converted to a single sheet after the image-forming device 104 and before the powder subsystem 106, or after the powder subsystem and before the fuser 108, or after the fuser and before the sensor 110. In examples, the web may be precut into individual sheets, with the sheets arranged as a stack of sheets held by the material feeder for individual processing by the AM system. The cutter 112 may cut the sheet with a mechanical instrument (e.g., blade, punch) or other approach (e.g., laser) as well understood by a skilled artisan.

In examples, the AM system 100 may also include a punching device 134 for placing registration apertures in the substrate material 118 or substrate sheets 132 thereof at desired locations. The registration apertures are placed in precise, pre-defined positions relative to the position of the substrate sheet for precise alignment of the patterned marking material images printed onto the sheets. This can be accomplished by mounting the punching device 134 proximate to the substrate material 118 being moved by the transfer subsystem 114, for example, on the same frame that the image-forming device 104 and powder subsystem 106 are placed, or using other alignment mechanisms that are well known in the art. The punching device 134 may include a hard instrument that pokes registration apertures out of the substrate material, or a laser cutter that cuts registration apertures from the substrate material.

In order to complete the AM process of forming a 3D object, the powder printed substrate sheets 132 may be stacked by aligning the substrate sheets via their registration apertures, and fused together to attach the stacked substrate sheets into the combined object. Then the uncoated substrate material may be removed from the combined object by, for example, abrasive blasting, chemical removal or dissolution. The stacker subsystem 116 is configured for stacking the cut printed substrate sheets 132 in register, based on the aforementioned registration apertures. As can be seen in FIG. 1, the stacker subsystem 116 receives the printed substrate sheets 132 with the registration apertures aligned about registration pins 136 of the stacker subassembly to form a stack 138 of the printed sheets.

After stacking the printed sheets, the patterned powder on the sheets may be combined and hardened into the 3D object. FIG. 1 shows the stacker subsystem 116 including a compressive device 140 including one or more elastic components (e.g., springs 142) to maintain pressure on the substrate sheets 132 even if they compress. After a number of substrate sheets (layers) have been placed in the stacker subsystem 116, one on top of the other on bed plate 144, the inserted substrate sheets may be compressed together with the spring 142 exerting presser on top plate 146 towards the bottom bed plate.

The compressed stack 138 may be heated, for example, in an oven (not shown). Heat from the oven causes the thermoplastic powder to melt. The molten material coats the substrate layers. The compressive device 140, with the substrate stack 138 in it, is then removed from the oven, and the substrate layers are allowed to cool. The molten material then solidifies. As it does so, it binds (fuses) the substrate sheets 132 together. Excess substrate (that has not been covered by the solidified material) is then removed as noted above by, for example, abrasive blasting, chemical removal or dissolution to result in a 3D printed object.

The process carried out by the AM system 100 may be sequenced and monitored using one or more controllers 150. The controller 150 may read and execute build instructions generated by an outboard computer (not depicted) based on a 3D model of the object that is to be printed. For example, the material feeder 102, image-forming device 104, powder subsystem 106, fuser 108, sensor 110, cutter 112, transfer subsystem 114, punching device 134 and stacker subsystem 116 may operate as discussed herein based on input from the controllers. Thus while the controller 150 is shown in communication with the image-forming device 104, it is understood that the controller may be in communication with any component of the AM system.

Figure 2:
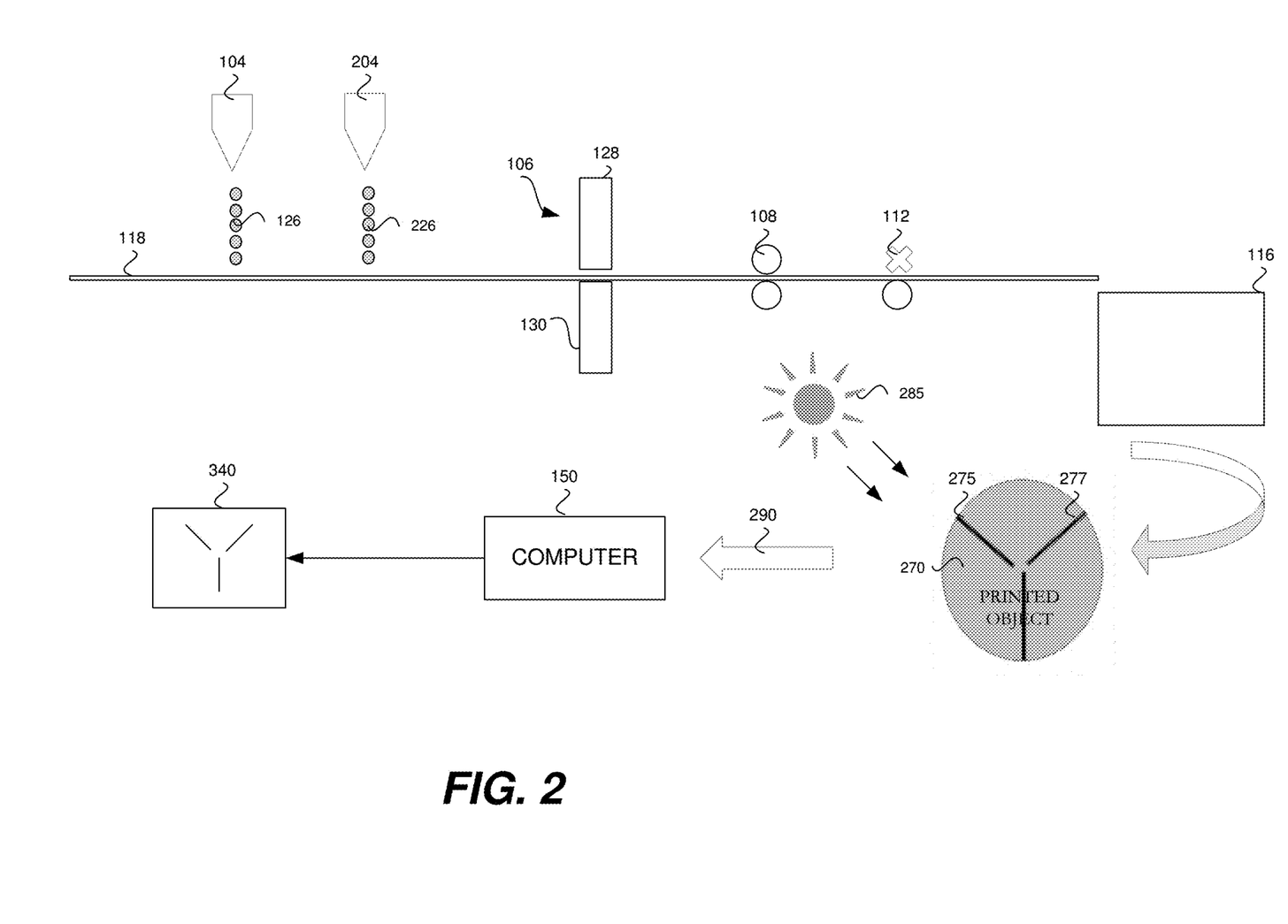
FIG. 2 is a block diagram of a system using a second-image forming device using a wetting agent with reflective properties to create reflective ray-like protrusions that can be detected and displayed by Augmented Reality (AR) hardware in accordance to an embodiment.
Figure 4:
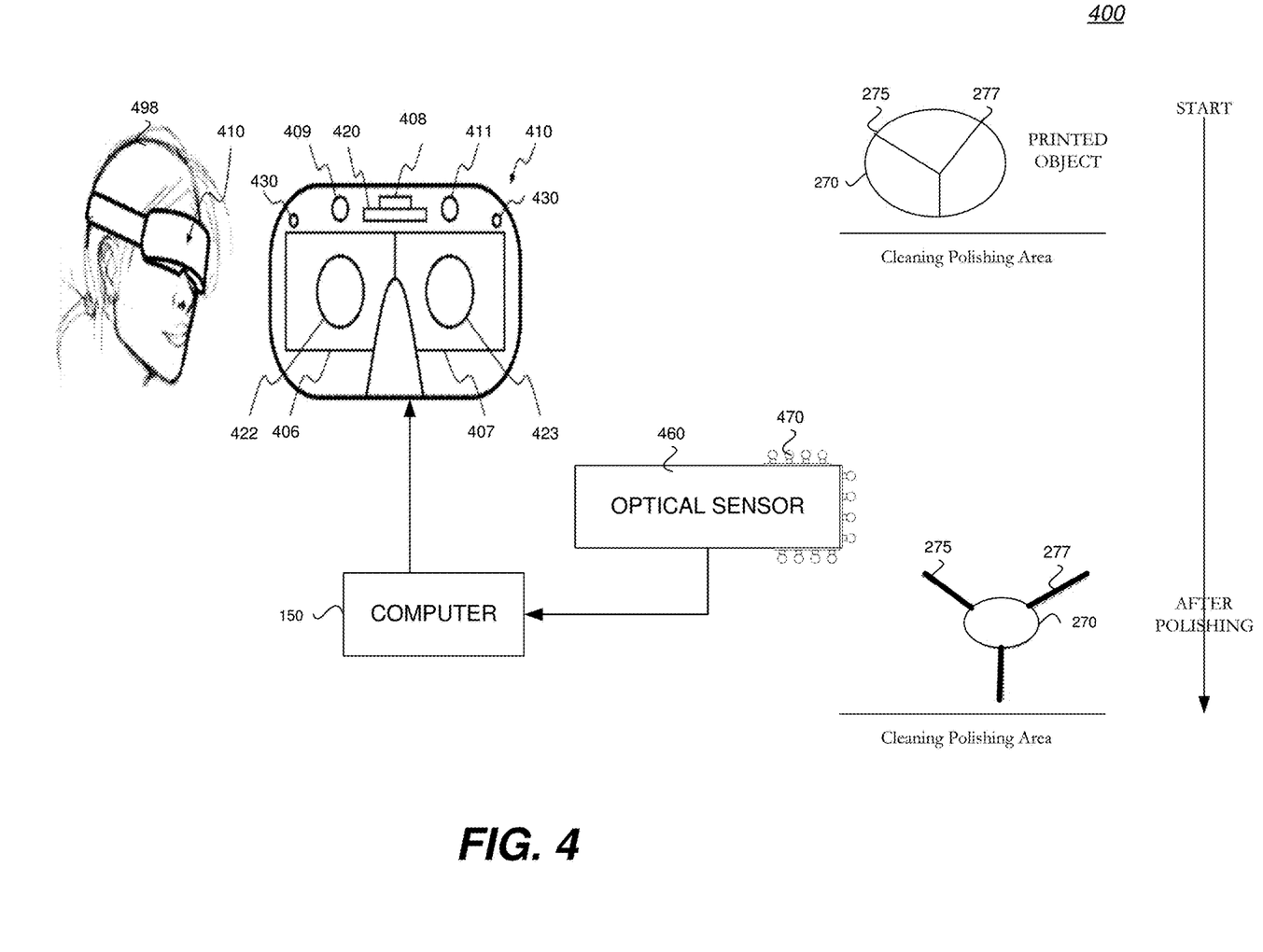
FIG. 4 shows a user, goggle looking outward, and some VR hardware to render a virtual image of an object with protrusions to guide the user in a sand blasting operation of the substrate stack in accordance to an environment; and, FIG. 5 is a flowchart depicting the operation of an exemplary method for rendering, after processing reflected data from the object, a virtual object in accordance to an embodiment.

The exemplary controller 150 may provide input, to or be a component of a controller for executing the AM 3D object forming process in a system such as that depicted in FIGS. 1-2 and 4.

Next, a second embodiment of the present invention will be described. Note that portions which are the same as those in the first embodiment described above are denoted by the same reference numerals, and descriptions of the same portions as those as in the first embodiment will be omitted.

FIG. 2 is a block diagram of a system using a second-image forming device using a wetting agent with reflective properties to create reflective ray-like protrusions that can be detected and displayed by Augmented Reality (AR) hardware in accordance to an embodiment.

The illustrated system shows some of the elements necessary to manufacture guides for an operator to use when sand blasting an object. The manufactured guides add Three-dimensional (3D) features to the 3D object's Computer Aided Design (CAD) model that will result in reflective ray-like protrusions such as 275 & 277 that can be detected by Augmented Reality (AR) hardware as shown in FIG. 4, such as that used in AR head-mounted displays (HMD), AR Eyeglasses, or AR Head-Up-Display (HUD) technology. Embedding of the 3D guide rays can be accomplished by use of second device or an additional print head 204 containing wetting fluid with special reflective properties 226 that when it combines with the material from 106 form ray like structures. These rays like structures are made visible as a result of the sand blasting. In this case the build surface (118) receives from a first device (104) a first wetting fluid, from a second device (204) a second wetting fluid and other fluid dispensing devices if a distinct fluid combination is required for the building of an object using AM process 100. After heating and compression 108 of the layer substrate stack, the end of the reflective protrusions would be visible on the outside surface when irradiated (lamp source 285) with electromagnetic radiation of a certain wavelength. The reflective rays 290 would be detected by the AR sensing hardware, providing positional information of the substrate stack seen through the AR viewing hardware. The positional feedback information would be utilized to create an overlay virtual image (overlay shown in display 340 of controller 150) of the object embedded within the stack, allowing the operator to see where the desired object is through the AR head gear's display as shown in FIG. 4. As the sand blasting proceeds (see FIG. 4 part labeled after polishing), the protruding rays are trimmed away, and the new outside edges are utilized to refresh the positional information. Augmented Reality guidance would greatly increase the speed of production, and greatly reduce the scrap rate.

Light sources 285 is a source of coherent white light, such as a white light-emitting diode (LED), deuterium lamp, a xenon arc source, or combination thereof. Other possible light sources 285 can comprise an individual laser (or group of lasers) of a specific wavelength like infrared (IR) or ultraviolet (UV), with differing ones of these other light sources emitting light at differing wavelengths. In some examples, such a lamp source 285 can be fitted into an existing IR-imaging apparatus so that the same apparatus can be used for both ablation and irradiation of the underlying layers of the built object 270. In another example, lamp source 285 can provide what is called actinic radiation which is irradiation with light, like UV light, IR light or visible light, irradiation with X-rays or gamma rays or irradiation with high energy particles, such as ions or electrons. As a source for actinic radiation for example a single UV lamp or a set of UV lamps can be used. Another possible source for actinic radiation is a laser, like e.g. a UV laser, an IR laser or a visible laser. Regardless of the light used and the purpose, the reflective properties of the wetting material 226 causes the end of the ray-like protrusions (275,277) to reflect the impinging electromagnetic (EM) radiation to create at computer/controller 150 a reflected image. The reflected image when combined with the CAD model produces an overlay virtual image of the object embedded within the stack.

Figure 3:
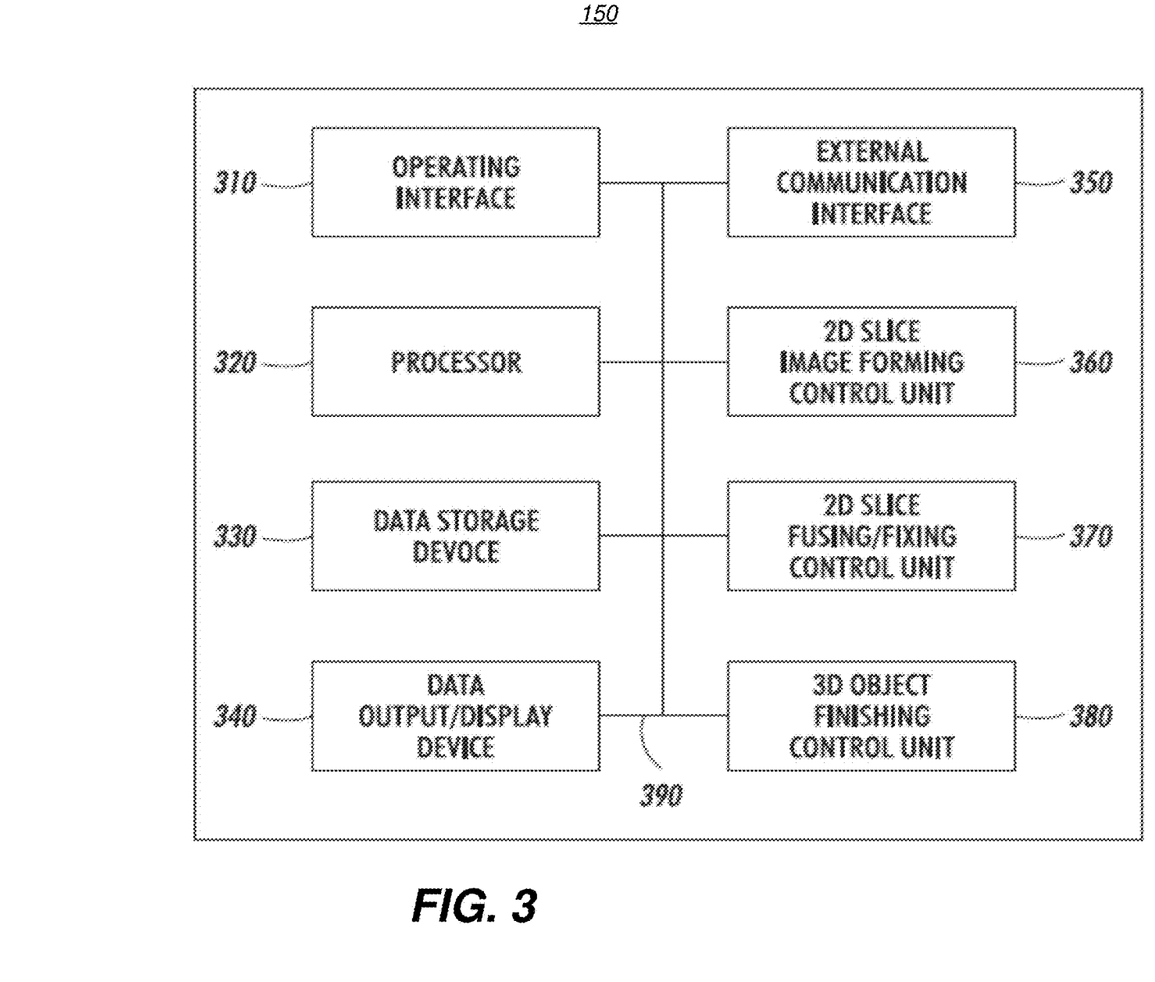
FIG. 3 illustrates a block diagram of an exemplary control system for implementing an additive manufacturing and material reclamation in accordance to an embodiment.

FIG. 3 illustrates a block diagram of an exemplary control system for implementing an additive manufacturing and material reclamation in accordance to an embodiment. The exemplary control system 150 may provide input, to or be a component of a controller for executing the AM 3D object forming process in a system such as that depicted in FIG. 1.

The exemplary control system 150 may include an operating interface 310 by which a user may communicate with the exemplary control system 150. The operating interface 310 may be a locally-accessible user interface associated with an AM 3D object forming device. The operating interface 310 may be configured as one or more conventional mechanism common to control devices and/or computing devices that may permit a user to input information to the exemplary control system 150. The operating interface 310 may include, for example, a conventional keyboard, a touchscreen with "soft" buttons or with various components for use with a compatible stylus, a microphone by which a user may provide oral commands to the exemplary control system 150 to be "translated" by a voice recognition program, or other like device by which a user may communicate specific operating instructions to the exemplary control system 150. The operating interface 310 may be a part or a function of a graphical user interface (GUI) mounted on, integral to, or associated with, the AM 3D object forming device with which the exemplary control system 150 is associated.

The exemplary control system 150 may include one or more local processors 320 for individually operating the exemplary control system 150 and for carrying into effect control and operating functions for AM 3D object forming, and specifically for implementing a tri-level electrophotographic layer forming scheme. Processor(s) 320 may include at least one conventional processor or microprocessor that interpret and execute instructions to direct specific functioning of the exemplary control system 150, and control of the AM 3D object forming process with the exemplary control system 150.

The exemplary control system 150 may include one or more data storage devices 330. Such data storage device(s) 330 may be used to store data or operating programs to be used by the exemplary control system 150, and specifically the processor(s) 330. Data storage device(s) 330 may be used to store information regarding, for example, one or more 3D object models for producing 3D objects in an AM 3D object forming device with which the exemplary control system 150 is associated. The stored 3D object model information may be devolved into data for the printing of a series of slightly oversize 2D slices for forming the 3D object in the manner generally described above. Data storage device 330 may be used to store a reference image, for example, of a substrate known to have provided a suitable object.

The data storage device(s) 330 may include a random access memory (RAM) or another type of dynamic storage device that is capable of storing updatable database information, and for separately storing instructions for execution of system operations by, for example, processor(s) 320. Data storage device(s) 330 may also include a read-only memory (ROM), which may include a conventional ROM device or another type of static storage device that stores static information and instructions for processor(s) 320. Further, the data storage device(s) 330 may be integral to the exemplary control system 150, or may be provided external to, and in wired or wireless communication with, the exemplary control system 150, including as cloud-based data storage components.

The exemplary control system 150 may include at least one data output/display device 340, which may be configured as one or more conventional mechanism that output information to a user, including, but not limited to, a display screen on a GUI of an AM 3D object forming device with which the exemplary control system 150 may be associated. The display device 340 can also include Augmented Reality (AR) hardware, such as that used in AR head-mounted displays (HMD), AR Eyeglasses, or AR Head-Up-Display (HUD) technology. The data output/display device 340 may be used to indicate to a user a status of an AM 3D object forming operation effected by the device with which the exemplary control system 150 may be associated including an operation of one or more individually controlled components at one or more of a plurality of separate processing stations in the device.

The exemplary control system 150 may include one or more separate external communication interfaces 350 by which the exemplary control system 150 may communicate with components external to the exemplary control system 150. At least one of the external communication interfaces 350 may be configured as an input port to support connecting an external CAD/CAM device storing modeling information for execution of the control functions in the AM 3D object forming operations. Any suitable data connection to provide wired or wireless communication between the exemplary control system 150 and external and/or associated components is contemplated to be encompassed by the depicted external communication interface 350.

The exemplary control system 150 may include a 2D slice image forming control unit 360 that may be used to control the a tri-level electrophotographic layer printing process that produces the series of 2D slices for the in-process 3D object according to devolved 3D object modeling information. The 2D slice image forming control unit 360 may operate as a part or a function of the processor 320 coupled to one or more of the data storage devices 330, or may operate as a separate stand-alone component module or circuit in the exemplary control system 150. Either of the processor 320 or the 2D slice image forming control unit 360 itself may parse the input 3D object model information to determine and execute a layer-by-layer 2D slice material layer printing scheme in the AM 3D object forming device.

The exemplary control system 150 may include a 2D slice fusing/fixing control unit 370 as a part or a function of the processor 320 coupled to one or more of the data storage devices 330, or as a separate stand-alone component module or circuit in the exemplary control system 150. The 2D slice fusing/fixing control unit 370 may be usable to control the functioning of one or more of a heat and/or pressure implemented 2D slice layer fixing process according to known methods derived from 2D xerographic image forming operations to join the individual 2D slices to one another.

The exemplary control system 150 may include a 3D object finisher control unit 380 for executing a final 3D object shaping scheme on a processed stack of cut and joined 2D slices in a subtractive machining process that may remove the layered support component structure and surface finish the 3D object. As with the above-enumerated other separate control units, the 3D object finisher control unit 380 may operate as a part or a function of the processor 320 coupled to one or more data storage devices 330 for executing finishing device operations, or may operate as a separate stand-alone component module or circuit in the exemplary control system 150.

All of the various components of the exemplary control system 150, as depicted in FIG. 3, may be connected internally, and to one or more AM 3D object forming devices, by one or more data/control busses 390. These data/control busses 390 may provide wired or wireless communication between the various components of the exemplary control system 150, whether all of those components are housed integrally in, or are otherwise external and connected to an AM 3D object forming device with which the exemplary control system 150 may be associated.

It should be appreciated that, although depicted in FIG. 3 as an integral unit, the various disclosed elements of the exemplary control system 150 may be arranged in any combination of sub-systems as individual components or combinations of components, integral to a single unit, or external to, and in wired or wireless communication with the single unit of the exemplary control system 150. In other words, no specific configuration as an integral unit or as a support unit is to be implied by the depiction in FIG. 3. Further, although depicted as individual units for ease of understanding of the details provided in this disclosure regarding the exemplary control system 150, it should be understood that the described functions of any of the individually-depicted components, and particularly each of the depicted control units, may be undertaken, for example, by one or more processors 320 connected to, and in communication with, one or more data storage device(s) 330. The computer/controller 150 would have augmented reality controller with instructions in a storage device to, based on the collected data from the image sensor such as optical sensor 460, determine a virtual object to be presented in a field of view, a position of the virtual object in the field of view, and a perspective of the simulated object in the field of view. Augmented reality controllers are well known to those in the augmented reality art and need not be discussed in more detail.

Figure 5:
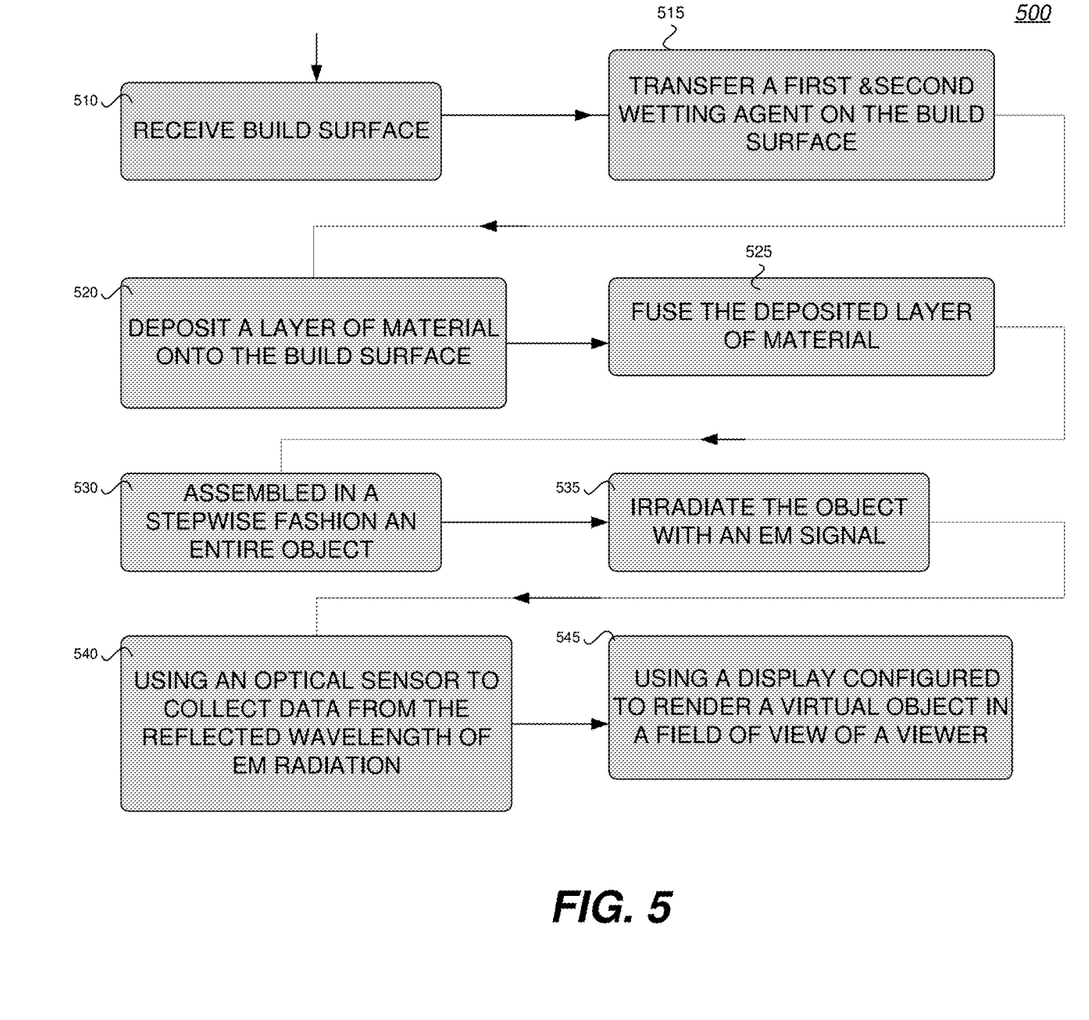

The disclosed embodiments may include exemplary methods for implementing an AM 3D object forming scheme using a tri-level electrostatic process for 2D slice forming for building up an in-process 3D object. FIG. 5 illustrate a flowchart of such an exemplary method and for using an augmented reality to visualize a built object to aide in sand blasting.

Next, a third embodiment of the present invention will be described. Note that portions which are the same as those in the first embodiment described above are denoted by the same reference numerals, and descriptions of the same portions as those as in the first embodiment will be omitted.

FIG. 4 shows a user, goggle looking outward, and some VR hardware 400 to render a virtual image of an object with protrusions to guide the user in a sand blasting operation of the substrate stack in accordance to an environment. VR hardware 400 could be VR goggles, AR head-mounted displays (HMD), AR Eyeglasses, or AR Head-Up-Display (HUD) technology, or other form of augmented reality FIG. 4 shows a virtual reality (VR) goggles embodiment of a head-worn device for displaying and viewing a manufactured object with guides/protrusions for aiding machining processes to be performed by operator such as user 498. The head-worn VR device 410 attached to a person 498 with a strap or headband. Also shown is the head-worn VR device 410 when looked at from the inside looking outward. It is important to note here that the goal of the VR device is to show a virtual image of the object and for the operator to see where the object is through the VR gear. In the augmented reality (AR) devices, the display (206 and/or 207) is either see-through, or it is opaque, but only covering one eye or part of an eye. In the VR device of FIG. 4, shown at 410, the display, shown at 406 (left display) and 407 (right display), is transparent and the person 498 is typically see the actual object and the scene being displayed, i.e., the display is a see-through display. The VR goggle 410 has elements and configurations including, but not limited to a head orientation sensor 408, an eye tracking video camera(s) 409 (left eye camera) and 411 (right eye camera), and an electronic module 420. In order for the person's eyes to be able to focus on the displays (406 and 407), there are typically two lenses 422 (left eye lens) and 423 (right eye lens) between the person's eyes and the displays, 406 and 407, when the VR device 410 is worn normally by the person 498. When the interior of the VR device 410 is not exposed to external light (406 and 407 are opaque), there can be one or more illumination source(s) 430 to provide light that can be used by the video camera(s) 409 and 411 to sense ocular parameters such as eye or eyelid position or eye motion or any of the other ocular parameters described in other parts of this document. The illumination source or sources 430 can use infrared, near infrared or visible light.

Referring specifically to the left and right eye tracking digital video cameras, 409 and 411 in FIG. 3B, these cameras (more generally eye sensors) can be used for more than just the tracking of eye position in response to head movement. The eye sensors 409 and 411 can also be used to perform functions acting through controller/computer 150 that could be tied to numerical machines and/or the displaying of the virtual object: The eye sensors could be used to provide control information to determine which of a plurality of choices a user has selected in a menu of options presented on a display. This selection could be to change the scene being displayed to the user. This selection could be used to turn something on or off. Further, the eye sensors could be used to image one or both retinas of the person 498, to capture anatomic features of a retina, to capture motion and/or orientation of a retina, and/or to determine retinal image stability and/or foveal fixation.

Continuing with FIG. 4, as noted earlier in FIG. 2 an optical sensor 460 with a light source 470, which is similar to light source 285, emits an EM field that causes the ray-like protrusions 275 & 277 to reflect the incident wavelength of electromagnetic radiation. The optical sensor 460, after collection of the data, sends to the computer 150 the raw data to then use with the CAD model to display for the user 498 a virtual image of the manufacture image. The simulated object can then be used as a guide for performing machining tasks until a finished object is produced. At the start of the process the end of the ray-like protrusion are visible with the rest of the protrusion is embedded into the object. After operations are performed the root like protrusions are made visible and could be trimmed away by the operator.

FIG. 5 is a flowchart depicting the operation of an exemplary method 500 for rendering, after processing reflected data from the object, a virtual object in accordance to an embodiment.

Concerning the flowchart of FIG. 5 the interconnection between the processes represents the exchange of information between the processes. Once the flow is modelled, each process may be implemented in a conventional manner. Each process may, for example, be programmed using a higher level language like Java, C++, Python, Perl, or the like, or may be performed using existing applications having a defined interface. For example, the function of certain processes may be provided by remote web servers using conventional web interfaces like CGI scripts or the like. As well, flow programming allows individual process to execute on different hardware and software platforms, or through the actions of an operator where possible, that may physically remote from each other. Upon execution, a run-time environment (including run-time code) acts as a flow engine and ensures co-operation between processes in accordance with the flow model. The run-time code typically looks after process execution; inter-process communication; errors; system crashes and the like. Conveniently, programmers and architects need not be concerned about these details as they are handled by run time code.

Method 500 begins with action 510 by receiving a build surface; then action 515 transfer a first & second wetting agent on to the build surface; then action 520 deposit a layer of material onto the build surface; and, then action 525 fuses the deposited layer of material. Method 500 continues with action 530 and repeats actions 510, 515, 520, and 525 to assemble in a stepwise fashion an entire object. Actions 535, 540, and 545 are actions that are performed after the built object and root like protrusions have been assembled so that by action 535 which irradiate the object with an EM signal and then in action 540 controller 150 uses the to collect data from the reflected wavelength of electromagnetic (EM) radiation and then controller uses the data and cad model in action 545 to display, to configured, and to render a virtual object in a field of view of a viewer augmented reality (AR) device 410.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. An object manufacturing system, the system comprising:
   a movable platform to receive a build surface;
   a first device configured to transfer a first wetting agent on the build surface;
   a second device configured to transfer a second wetting agent on the build surface;
   wherein the second wetting agent comprises a wetting agent with reflective properties;
   a material depositing system configured to deposit a layer of material onto the build surface; and
   a transfuse station configure to fuse the deposited layer of material;
      wherein each layer of an object is assembled in a stepwise fashion until an entire object is built;
      wherein material deposited on the second wetting agent causes an outside surface of the built object to reflect incident wavelength of electromagnetic radiation;
      wherein the first device is a print head to selectively deposit the first wetting agent;
   an optical sensor to emit the incident wavelength of electromagnetic radiation and to collect data from the reflected wavelength of electromagnetic radiation;
   an augmented reality controller to create, based on the collected data from the optical sensor, a virtual object with guide rays to be presented in a field of view, a position of the virtual object in the field of view, and a perspective of the simulated object in the field of view;
   wherein the virtual object with guide rays is a combination of a computer-aided design (CAD) model of the object and the collected data of the reflect incident wavelength of electromagnetic radiation from the material deposited on the second wetting agent.

2. The object manufacturing system of claim 1, wherein the second device is a print head to selectively deposit the second wetting agent.

3. The object manufacturing system of claim 2, the system further comprising:

a display configured to render the virtual object in a field of view of a viewer.

4. The object manufacturing system of claim 3, wherein the display comprises augmented reality (AR) hardware.

5. The object manufacturing system of claim 3, wherein the display comprises a see-through head-mounted display.

6. The object manufacturing system of claim 3, wherein the second wetting agent and the material form at least one reflective protrusion.

7. The object manufacturing system of claim 6, wherein the at least one reflective protrusion is embedded into the built object;
wherein the virtual object includes what the built object should look like after sand blasting.

8. A method of printing an object onto a build platform using a printing system, the method comprising:
causing a movable platform to receive a build surface;
causing a first device to transfer a first wetting agent on the build surface;
causing a second device to transfer a second wetting agent on the build surface;
wherein the second wetting agent comprises a wetting agent with reflective properties;
causing a material depositing system to deposit a layer of material onto the build surface; and
using a transfuse station configure to fuse the deposited layer of material;
wherein each layer of an object is assembled in a stepwise fashion until an entire object is built;
wherein material deposited on the second wetting agent causes an outside surface of the built object to reflect incident wavelength of electromagnetic radiation;
wherein the first device is a print head to selectively deposit the first wetting agent;
using an optical sensor to emit the incident wavelength of electromagnetic radiation and to collect data from the reflected wavelength of electromagnetic radiation;
using an augmented reality controller to create, based on the collected data from the optical sensor, a virtual object with guide rays to be presented in a field of view, a position of the virtual object in the field of view, and a perspective of the simulated object in the field of view;
wherein the virtual object with guide rays is a combination of a computer-aided design (CAD) model of the object and the collected data of the reflect incident wavelength of electromagnetic radiation from the material deposited on the second wetting agent.

9. The method of claim 8, wherein the second device is a print head to selectively deposit the second wetting agent.

10. The method of claim 8, the method further comprising:
using a display configured to render the virtual object in a field of view of a viewer.

11. The method of claim 10, wherein the display comprises augmented reality (AR) hardware.

12. The method of claim 10, wherein the display comprises a see-through head-mounted display.

13. The method of claim 10, wherein the second wetting agent and the material form at least one reflective protrusion.

14. The method of claim 13, wherein the at least one reflective protrusion is embedded into the built object;
wherein the virtual object includes what the built object should look like after sand blasting.

* * * * *